US011862175B2

(12) United States Patent
Thiagarajah et al.

(10) Patent No.: US 11,862,175 B2
(45) Date of Patent: Jan. 2, 2024

(54) USER IDENTIFICATION AND AUTHENTICATION

(71) Applicant: Verizon Patent and Licensing Inc., Basking Ridge, NJ (US)

(72) Inventors: Sukumar Thiagarajah, Laurence Harbor, NJ (US); Jyotsna Kachroo, Millburn, NJ (US); Michael A. Adel, Flemington, NJ (US); Dayong He, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 360 days.

(21) Appl. No.: 17/160,741

(22) Filed: Jan. 28, 2021

(65) Prior Publication Data

US 2022/0238115 A1 Jul. 28, 2022

(51) Int. Cl.
*G10L 17/04* (2013.01)
*G10L 17/06* (2013.01)
*G10L 17/22* (2013.01)
*G06F 21/32* (2013.01)
*G10L 17/00* (2013.01)

(52) U.S. Cl.
CPC ............. *G10L 17/04* (2013.01); *G06F 21/32* (2013.01); *G10L 17/06* (2013.01); *G10L 17/22* (2013.01); *G06F 2221/2117* (2013.01); *G10L 17/00* (2013.01)

(58) Field of Classification Search
CPC ......... G10L 17/04; G10L 17/06; G10L 17/22; G10L 17/00; G06F 21/32; G06F 2221/2117

USPC ......................................................... 704/243
See application file for complete search history.

(56) References Cited

U.S. PATENT DOCUMENTS

| | | | | |
|---|---|---|---|---|
| 9,325,749 | B2* | 4/2016 | Bangor | H04L 65/403 |
| 9,899,024 | B1* | 2/2018 | Kanevsky | G10L 25/63 |
| 10,163,437 | B1* | 12/2018 | St. Angel | G06F 3/167 |
| 10,321,185 | B2* | 6/2019 | Athias | H04N 21/252 |
| 10,607,148 | B1* | 3/2020 | Niewczas | G10L 17/08 |
| 10,621,317 | B1* | 4/2020 | Sardari | G06F 21/83 |
| 10,715,380 | B2* | 7/2020 | Pai | H04W 64/003 |
| 10,748,125 | B2* | 8/2020 | Xing | A63F 13/792 |
| 10,757,499 | B1* | 8/2020 | Vautrin | G10L 15/22 |
| 10,783,269 | B1* | 9/2020 | Shraer | H04L 9/3242 |
| 10,924,347 | B1* | 2/2021 | Narsian | H04L 47/12 |
| 10,958,457 | B1* | 3/2021 | Davis | H04L 12/2803 |
| 11,010,719 | B1* | 5/2021 | Byon | G06F 11/3409 |
| 11,070,644 | B1* | 7/2021 | Teng | H04L 67/306 |
| 11,087,739 | B1* | 8/2021 | Rastrow | G10L 15/30 |
| 11,102,251 | B1* | 8/2021 | Pettit | H04L 63/205 |
| 11,120,093 | B1* | 9/2021 | Cuan | G06F 16/9566 |
| 11,157,295 | B2* | 10/2021 | Schur | G06F 3/0484 |

(Continued)

*Primary Examiner* — Edwin S Leland, III

(57) ABSTRACT

One or more computing devices, systems, and/or methods for user identification and authorization are provided. In an example, a voice command to perform an action is detected. A voice profile associated with a user is identified based upon voice characteristics of the voice command. In response to determining that the voice profile is not linked to an account associated with the action, the user is prompted for an identifier associated with a device for creating the account through the device. In response to receiving the identifier from the user, the identifier is utilized to facilitate creation of the account through the device.

20 Claims, 11 Drawing Sheets

(56) References Cited

U.S. PATENT DOCUMENTS

| | | | |
|---|---|---|---|
| 11,172,061 B1* | 11/2021 | Graber | G06Q 20/401 |
| 11,223,699 B1* | 1/2022 | Niewczas | G06F 3/167 |
| 11,257,494 B1* | 2/2022 | Zhong | G06N 20/00 |
| 11,303,754 B1* | 4/2022 | Haltom | H04M 3/53325 |
| 11,355,098 B1* | 6/2022 | Zhong | G10L 15/22 |
| 11,361,292 B2* | 6/2022 | Rathod | G06Q 30/0241 |
| 11,399,028 B1* | 7/2022 | Krishnamoorthy | H04L 63/102 |
| 11,528,274 B1* | 12/2022 | Krishnamoorthy | H04W 12/35 |
| 11,575,732 B1* | 2/2023 | Liu | H04L 67/10 |
| 2002/0143549 A1* | 10/2002 | Kontonassios | G06Q 10/10 704/E15.04 |
| 2007/0033139 A1* | 2/2007 | Handler | G06Q 20/40 705/44 |
| 2008/0221898 A1* | 9/2008 | Cerra | G10L 15/30 704/E15.047 |
| 2008/0221902 A1* | 9/2008 | Cerra | G10L 15/065 704/235 |
| 2008/0288252 A1* | 11/2008 | Cerra | G10L 15/30 704/E15.047 |
| 2008/0312934 A1* | 12/2008 | Cerra | G10L 15/30 704/E15.047 |
| 2009/0030684 A1* | 1/2009 | Cerra | G10L 15/16 704/E15.001 |
| 2009/0030685 A1* | 1/2009 | Cerra | G10L 15/183 704/E15.001 |
| 2009/0030687 A1* | 1/2009 | Cerra | G10L 15/065 704/E15.001 |
| 2009/0030688 A1* | 1/2009 | Cerra | G10L 15/30 704/E15.001 |
| 2009/0030691 A1* | 1/2009 | Cerra | G10L 15/183 704/E15.001 |
| 2009/0030696 A1* | 1/2009 | Cerra | G10L 15/30 704/275 |
| 2009/0030697 A1* | 1/2009 | Cerra | G10L 15/30 704/E15.001 |
| 2009/0030698 A1* | 1/2009 | Cerra | G10L 15/30 704/E15.04 |
| 2010/0106497 A1* | 4/2010 | Phillips | G10L 15/30 704/E15.001 |
| 2010/0185448 A1* | 7/2010 | Meisel | G06F 3/167 704/E15.005 |
| 2011/0054894 A1* | 3/2011 | Phillips | G10L 15/30 704/235 |
| 2011/0054895 A1* | 3/2011 | Phillips | G10L 15/075 704/235 |
| 2011/0054896 A1* | 3/2011 | Phillips | G10L 15/30 704/235 |
| 2011/0054897 A1* | 3/2011 | Phillips | G10L 15/30 704/235 |
| 2011/0054898 A1* | 3/2011 | Phillips | G10L 15/30 704/235 |
| 2011/0054899 A1* | 3/2011 | Phillips | G10L 15/30 704/235 |
| 2011/0054900 A1* | 3/2011 | Phillips | G10L 15/30 704/235 |
| 2011/0055256 A1* | 3/2011 | Phillips | G06F 16/9535 707/769 |
| 2011/0060587 A1* | 3/2011 | Phillips | G10L 15/30 704/235 |
| 2011/0066634 A1* | 3/2011 | Phillips | G10L 15/22 707/769 |
| 2011/0179270 A1* | 7/2011 | Tewari | H04L 63/168 707/E17.107 |
| 2011/0283259 A1* | 11/2011 | Lawson | H04M 15/51 717/121 |
| 2013/0269014 A1* | 10/2013 | Gerber | H04L 63/083 715/234 |
| 2013/0290234 A1* | 10/2013 | Harris | G06Q 30/00 901/50 |
| 2014/0274211 A1* | 9/2014 | Sejnoha | G10L 17/22 455/563 |
| 2014/0330559 A1* | 11/2014 | Higbie | G10L 17/22 704/235 |
| 2015/0033305 A1* | 1/2015 | Shear | G06F 21/6218 726/11 |
| 2015/0073907 A1* | 3/2015 | Purves | G06Q 20/384 705/14.58 |
| 2015/0120555 A1* | 4/2015 | Jung | G06Q 50/01 705/44 |
| 2015/0127628 A1* | 5/2015 | Rathod | G06Q 30/0251 707/710 |
| 2015/0347518 A1* | 12/2015 | Kurian | G06F 16/3329 707/784 |
| 2015/0348007 A1* | 12/2015 | Khan | G06Q 20/321 705/44 |
| 2015/0348048 A1* | 12/2015 | Kurian | G06Q 30/016 705/304 |
| 2016/0012465 A1* | 1/2016 | Sharp | G06Q 20/321 705/14.17 |
| 2017/0169506 A1* | 6/2017 | Wishne | G06F 21/313 |
| 2018/0246983 A1* | 8/2018 | Rathod | G06F 16/972 |
| 2018/0260481 A1* | 9/2018 | Rathod | G06F 16/958 |
| 2018/0277123 A1* | 9/2018 | Boesen | H04R 1/1041 |
| 2018/0314762 A1* | 11/2018 | Rathod | H04L 63/102 |
| 2018/0350144 A1* | 12/2018 | Rathod | G06Q 20/3224 |
| 2018/0374480 A1* | 12/2018 | Wang | G10L 15/22 |
| 2019/0066670 A1* | 2/2019 | White | G10L 15/28 |
| 2019/0089831 A1* | 3/2019 | Medlen | G10L 15/26 |
| 2019/0139063 A1* | 5/2019 | Lamm | G06Q 30/0204 |
| 2019/0171700 A1* | 6/2019 | Dart | G06F 40/166 |
| 2019/0182176 A1* | 6/2019 | Niewczas | G10L 17/24 |
| 2019/0205148 A1* | 7/2019 | Schur | G06F 9/453 |
| 2019/0205998 A1* | 7/2019 | Schur | G06Q 10/1053 |
| 2019/0378499 A1* | 12/2019 | Miller | G06F 3/167 |
| 2019/0378500 A1* | 12/2019 | Miller | G06F 3/167 |
| 2020/0014552 A1* | 1/2020 | Tan | H04L 12/2809 |
| 2020/0020330 A1* | 1/2020 | Guo | G01R 31/002 |
| 2020/0034622 A1* | 1/2020 | Thakurta | G06V 40/20 |
| 2020/0051558 A1* | 2/2020 | Yeon | G06F 3/167 |
| 2020/0090249 A1* | 3/2020 | Weislo | G06Q 30/0631 |
| 2020/0097506 A1* | 3/2020 | Kephart | G06F 16/954 |
| 2020/0160985 A1* | 5/2020 | Kusuma | G16H 30/40 |
| 2020/0196018 A1* | 6/2020 | Burbank | H04N 21/2542 |
| 2020/0207358 A1* | 7/2020 | Katz | G01C 21/3697 |
| 2020/0265859 A1* | 8/2020 | LaBosco | G10L 21/0232 |
| 2020/0275204 A1* | 8/2020 | LaBosco | G10L 21/0232 |
| 2020/0301721 A1* | 9/2020 | Porter | G06F 9/44578 |
| 2020/0364588 A1* | 11/2020 | Knox | G06V 40/20 |
| 2020/0380166 A1* | 12/2020 | Kane | G06F 21/6245 |
| 2020/0380981 A1* | 12/2020 | Tom | G06Q 30/0251 |
| 2020/0387887 A1* | 12/2020 | Rathod | G06Q 20/3224 |
| 2021/0042724 A1* | 2/2021 | Rathod | G07G 1/0054 |
| 2021/0089847 A1* | 3/2021 | Crisp | G06K 15/18 |
| 2021/0110102 A1* | 4/2021 | Kershner | G06F 3/04883 |
| 2021/0176340 A1* | 6/2021 | Rose | G06Q 20/405 |
| 2021/0185036 A1* | 6/2021 | Handler | H04L 63/0861 |
| 2021/0249006 A1* | 8/2021 | Bromand | G10L 21/0272 |
| 2021/0250641 A1* | 8/2021 | Aguiar | H04N 21/4223 |
| 2021/0264520 A1* | 8/2021 | Cummings | G06Q 40/12 |
| 2021/0389854 A1* | 12/2021 | Rose | G06F 3/0482 |
| 2022/0022747 A1* | 1/2022 | Malfavon | A61B 5/0008 |
| 2022/0029981 A1* | 1/2022 | Mavani | G06F 3/167 |
| 2022/0066730 A1* | 3/2022 | Warren | H05B 47/19 |
| 2022/0238115 A1* | 7/2022 | Thiagarajah | G10L 17/06 |
| 2023/0083642 A1* | 3/2023 | Saginawa | G06F 21/6245 726/27 |

* cited by examiner

USER IDENTIFICATION AND AUTHENTICATION

BACKGROUND

Many devices have speech recognition functionality, such as mobile phones, smart speakers, cameras, televisions, watches, vehicle computers, and a wide variety of other types of devices. A smart device may implement speech recognition functionality in order to process and understand voice commands from a user. For example, a digital assistant hosted by a smart watch may receive a voice command spoken by a user wearing the smart watch, such as where the user is asking for a weather report. The digital assistant may evaluate the voice command to determine that the user is requesting the weather report. Accordingly, the digital assistance may provide the user with the weather report through the smart watch.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
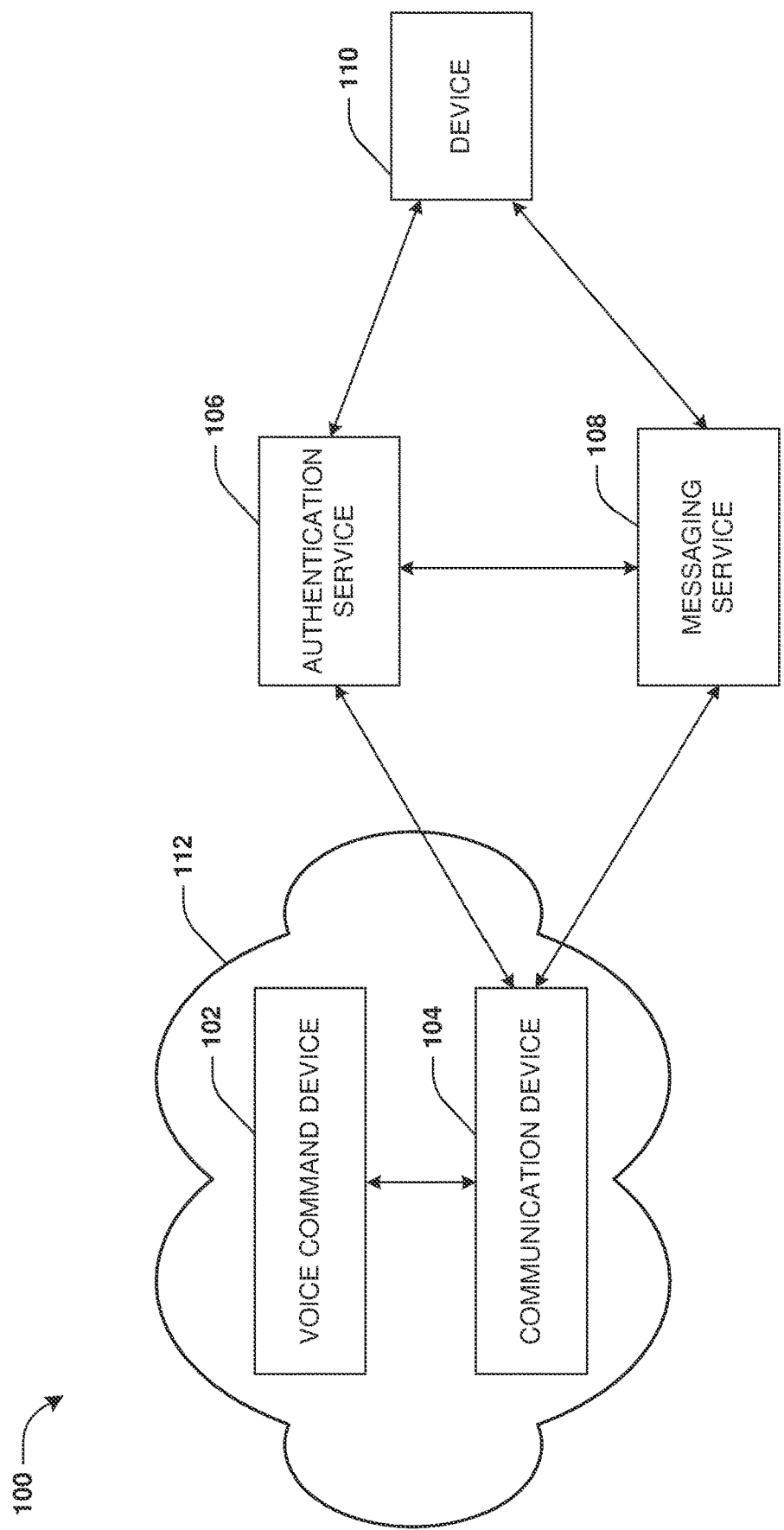
FIG. 1 is a diagram illustrating an example system for user identification and authentication.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for user identification and authentication are provided. A network may comprise various devices and/or services configured to provide functionality to users and client devices. For example, an authentication service may authenticate users connecting to the network, a messaging service may provide notifications and messages to client devices such as a push notification to a mobile device, an email service may provide users with access to email accounts, etc. In order to provide services and functionality to a large and/or ever growing user base of client devices, the network would scale out with additional computing resources and bandwidth in order to reduce latency otherwise experienced by client devices. However, scaling out the network with additional computing resources and bandwidth can be costly and/or impractical for a service provider.

Accordingly, as provided herein, a user identification and authentication framework is provided for offloading user identification and authentication functionality to client devices connected to the network in order to scale out the network in a secure and efficient manner. The user identification and authentication framework may allow users to choose what client devices to utilize for authentication, such as a digital assistant, a camera, or any other type of client device, and to seamlessly switch between different client devices for authentication. The user identification and authentication framework allows users to opt-in their client devices for performing user identification and authentication functionality. Offloading such processing from devices and/or services of the network to client devices provides the ability to scale out the network to support more users and client devices. This is because computing and processing resources of the devices and/or services of the network are no longer being consumed for performing user identification and authentication, and instead can be used for providing other services and functionality to users. Having additional computing and processing resources for providing services and functionality to users will reduce latency and/or processing overhead.

Various types of client devices may be utilized by the identification and authentication framework for providing user identification functionality and/or authentication functionality. In some examples, a voice command device may be utilized by the identification and authentication framework for providing user identification functionality. The voice command device may comprise a device that operates on voice commands, and is capable of identifying users based upon the voice commands. For example, the voice command device may create and maintain unique voice profiles for users based upon voice characteristics of the users, such as phonation, pitch, loudness, texture, tone, speech rate, etc. In some examples, the voice command device may comprise a smart speaker, a watch, a mobile device, a thermostat, a camera, a television, a videogame console, or any other client device capable of identifying users. In some examples, the voice command device may be incorporated into and/or is part of a communication device capable of connecting to the network, or may be a separate device from the communication device.

It may be appreciated that a wide variety of other client devices beyond voice command devices may be utilized for user identification. Such client devices leveraged for user identification may include devices capable of identifying users based upon biometric data (e.g., facial recognition, fingerprinting, etc.), devices capable of identifying users based upon user authentication information (e.g., a username and password), videogame consoles, televisions, mobile devices, smart home devices, enterprise devices, multi-access edge computing (MEC) client devices, a device capable of implementing multiple techniques for authentication (e.g., a device that implements both voice print authentication and fingerprint authentication), etc. In this way, any type of device capable of identifying users (e.g., utilizing fingerprint profiles of user fingerprints, facial recognition profiles of user faces, a username/password repository of user accounts of users, etc.) may be utilized by the identification and authentication framework for providing user identification functionality. These client devices may communicate with other devices and/or services of the network in order to communicate user identification information, account information, authentication information, and/or service requests to perform actions. For example, once a user has been identified and has registered an account linked to a profile of the user, the user may issue commands to the client device for routing to services within the network for performing actions (e.g., pay a bill, schedule a service appointment, purchase a product, etc.).

In some examples, a device, such as a client device, may be utilized by the identification and authentication framework for providing user authentication functionality. The client device may comprise any type of device capable of authenticating a user. For example, the client device may comprises a smartphone, a smart watch, a computer, a laptop, a videogame system, a tablet, a vehicle computer, or any other type of client device capable of authenticating a user. The client device may utilize various types of authentication mechanisms for authenticating the user, which may be utilized in conjunction with an authentication service (e.g., an identity online server). For example, the client device may utilize biometric verifications such as facial recognition, a fingerprint, etc., a password or pin, or any other type of authentication mechanism in order to authenticate the user. The device client may operate in conjunction with other devices and/or services of the network in order to facilitate the authentication of the user, such as the authentication service for authentication and a messaging service for communication. In some examples, the client device may be a different client device than the client device used to identify the user (e.g., the voice command device, a camera device, a device with fingerprint recognition functionality, etc.) or the same client device may be utilized for both user identification and user authentication.

In some examples, a communication device may be utilized by the identification and authentication framework for providing communication between the client device used for user identification such as the voice command device, the client device used for user authentication, and other devices and/or services of the network such as the authentication service and the messaging service. It may be appreciated that in some instances, the communication device refers to an identity service hosted on a device with communication capabilities and/or the client device may refer to an authentication service hosted on a client on-prem device, for example, and thus the communication device and/or client device may correspond to a service hosted by a device. The communication device may be used to facilitate the communication of user identification information, authentication information, account creation information, and/or service requests to perform actions. In some examples, the communication device may reside within a same network as the client device used for user authentication (e.g., the communication device and the voice command device may be connected to a same home network) in order to enhance security. In some examples, the device used for user authentication and the communication device may comprise the same device, such as where voice command functionality is integrated into the communication device. In some examples, the device used for user authentication and the communication device are separate devices. The communication device is configured to provide communication functionality over the network to other devices and/or services hosted within the network. In some examples, the communication device comprises a router, a server, a thin multi-access edge computing (MEC) device, or any other device capable of connecting to the network.

Because the device used for user identification (e.g., the voice command device, a camera device, a device with fingerprint recognition functionality, etc.), the device used for user authentication (e.g., a smartphone, a smart watch, etc.), and/or the communication device (e.g., a router) may comprise client devices, computational processing can be offloaded from other devices and/or services of the network to these client devices. In this way, resources of the network can be freed for other purposes such as providing services to users and client devices at lower latencies and/or for scaling out to provide services to a larger user and client device base.

A user may utilize the identification and authentication framework in order to register accounts with services that can perform actions on behalf of the user, such as paying bills, purchasing products, scheduling service, etc. For example, the user may speak a voice command "schedule a service appointment to upgrade my internet connection," which is detected by a voice command device. The voice command device may identify a voice profile associated with the user based upon voice characteristics of the voice command. If the voice command device does not have the capability to identify a voice profile associated with the user, then the communication device may be capable of identifying the voice profile associated with the user. If the voice profile is not linked to an account associated with the action (e.g., the voice profile is not linked to an internet service provider account of the user with an internet service provider), then the user may be prompted for an identifier of a device such as a phone number of a smart phone. The voice command device and/or the communication device may be utilized to communicate with other services, such as an authentication service and a messaging service, in order to provide a push notification to the smart phone using the phone number so that the user can authenticate and create the account with the internet service provider through the smart phone.

Once an account is created, the voice profile of the user is linked to the account so that subsequent voice commands associated with the account can be processed without further registration or account creation. For example, the user may subsequently speak a voice command "pay my internet bill," which is detected by the voice command device. The voice command device may identify the voice profile associated with the user based upon voice characteristics of the voice command. Because the voice profile is linked to the account with the internet service provider associated with bill the user wants to pay, the user is authenticated with an authentication service and a perform action command is transmitted by the communication device to the internet service provider to perform an action to pay the internet bill of the user.

FIG. 1 illustrates a system 100 for user identification and authentication. The system 100 may employ a user identification and authentication framework in order to utilize various client devices for performing user identification and authentication functionality. A voice command device 102 may be capable of receiving, processing, and/or implementing voice commands from users utilizing speech recognition functionality. In some embodiments, the voice command device 102 may be a standalone device or may be part of another device (e.g., a smart speaker, a smart watch, a smart phone, a smart television, a videogame console, a smart thermostat, etc.). The voice command device 102 may host a digital assistant configured to process voice commands utilizing the speech recognition functionality.

The voice command device 102 may be configured to create and maintain voice profiles for users, which can be used to identify a particular user that spoke a voice command. A voice profile for a user may comprise voice characteristics of the user, which can be compared to voice characteristics of a voice command to determine whether the user spoke the voice command or whether another user spoke the voice command. Accordingly, the voice command device 102 may be utilized by the user identification and authentication framework for user identification based upon the voice profiles. It may be appreciated that other types of devices may be utilized by the user identification and authentication framework for user identification, such as a camera capable of identifying users based upon facial recognition functionality, a device capable of identifying users based upon biometric data, a device capable of identifying users based upon user input (e.g., a password or pin), a videogame console, a smart television, a smart home device, an enterprise device, a multi-access edge computing (MEC) device, etc.

The user identification and authentication framework may utilize a communication device 104 in order to communicate with the voice command device 102. In some examples, the communication device 104 and the voice command device 102 are connected over a network 112, such as a home network or an enterprise network. The communication device 104 may be utilized to facilitate communication between the voice command device 102 and other devices and/or services, such as an authentication service 106, a messaging service 108, services capable of performing actions on behalf of users, etc. In some examples, the voice command device 102 may be incorporated into the communication device 104 or may be a separate device. The communication device 104 may comprise any device capable of connecting to the other devices and services over a network such as a service provider network. For example, the communication device 104 may comprise a router, a server, or other client device. In this way, the communication device 104 provides a communication bridge between the voice command device 102 and other devices and services, such as the authentication service 106 and the messaging service 108.

The authentication service 106 may be configured to perform authentication and registration of a user, a client device of the user, and/or an account of the user. For example, the voice command device 102 may identify a user that spoke a voice command to perform an action. A determination may be made that a voice profile of the user is not linked to an account associated with the performance of the action. Accordingly, the authentication service 106 is invoked to authenticate the user for creating and registering the account. The authentication service 106 may be provided with an identifier of a device 110 of the user such as a phone number of a mobile device through which the user can authenticate. The authentication service 106 may utilize the messaging service 108 to send a push notification to the device 110 to guide the user through authenticating through the device 110 using an authentication user interface of the authentication service. In some examples, the device 110 such as a smart phone may perform facial recognition, voice recognition, request a password/pin, perform biometric authentication, verify a fingerprint, or perform other authentication for authenticating the user through the authentication user interface.

Once the user has performed authentication through the device 110, the authentication service 106 may store authentication data (e.g., an authentication key such as a private key and/or public key, a global unique identifier such as a fast identity online global unique identifier (e.g., a random Global Unique Identifier) generated as a result of the device 110 authenticating the user in association with the authentication service 106, the identifier of the device 110, account information of the account being created, etc.) for subsequently authenticating actions requested by the user to perform for the account. In this way, the authentication service 106 may perform an initial authentication of the user through the device 110 for creating and registering the account.

Once the authentication service 106 has authenticated the user and registered the account, the communication device 104 or other device may link the voice profile of the user to the account to create an account link. For example, an authentication service hosted by a client on-prem device, such as the communication device 104 or other device, and/or a service provider cloud may link the voice profile to create the account link. The voice profile may be linked to the account by storing the global unique identifier and the authentication key such as the public key within the account link. When the voice command device 102 receives a subsequent voice command from the user to perform an action associated with the account, the communication device 104 and/or the voice command device 102 may identify and utilize the account link for facilitating the performance of the action by a service associated with the account, as opposed to initiating registration again. In this way, various client devices may be leveraged for providing user identification and authentication.

Figure 2:
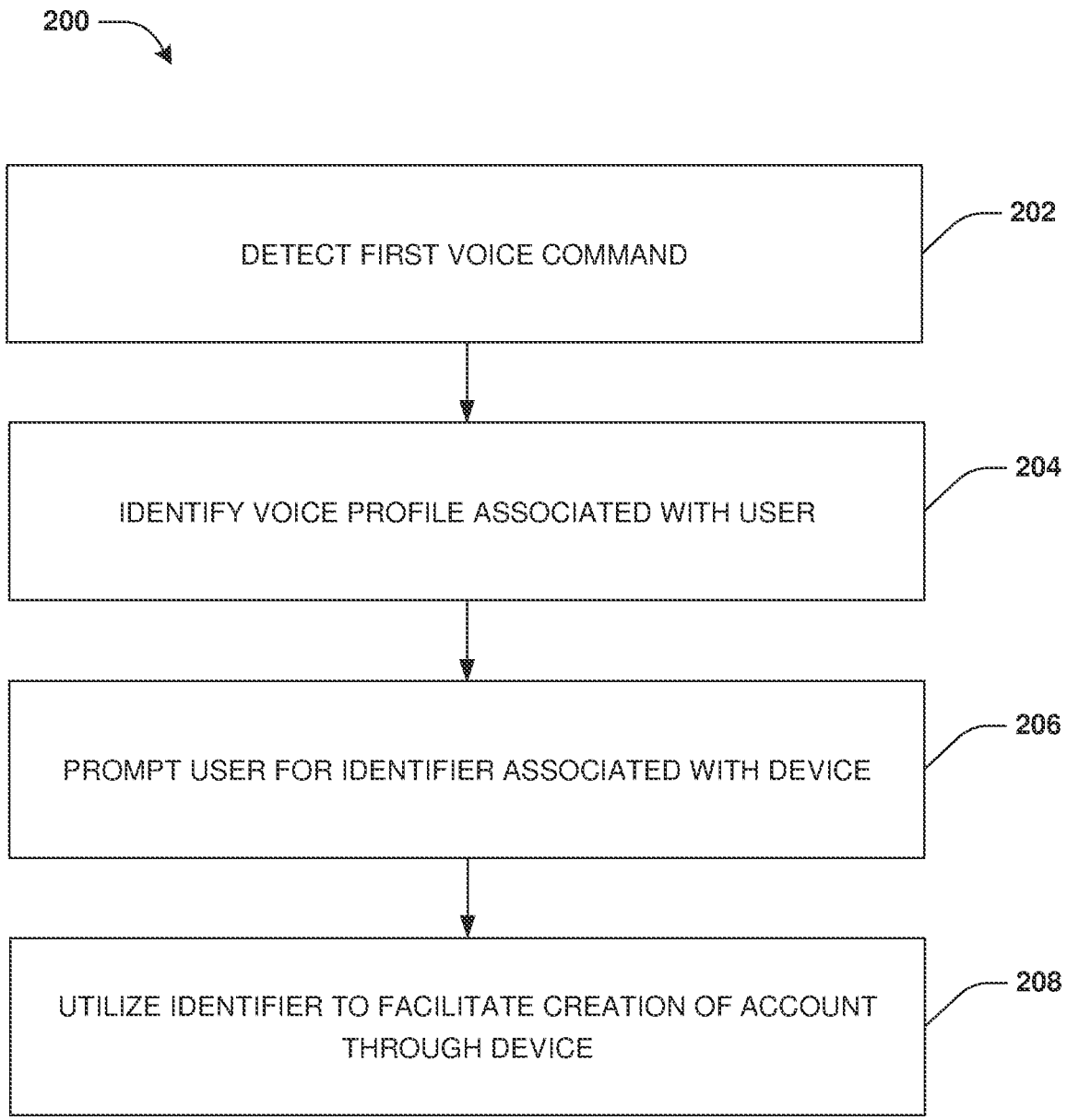
FIG. 2 is a flow chart illustrating an example method for user identification and authentication, where account creation is facilitated.
Figure 3:
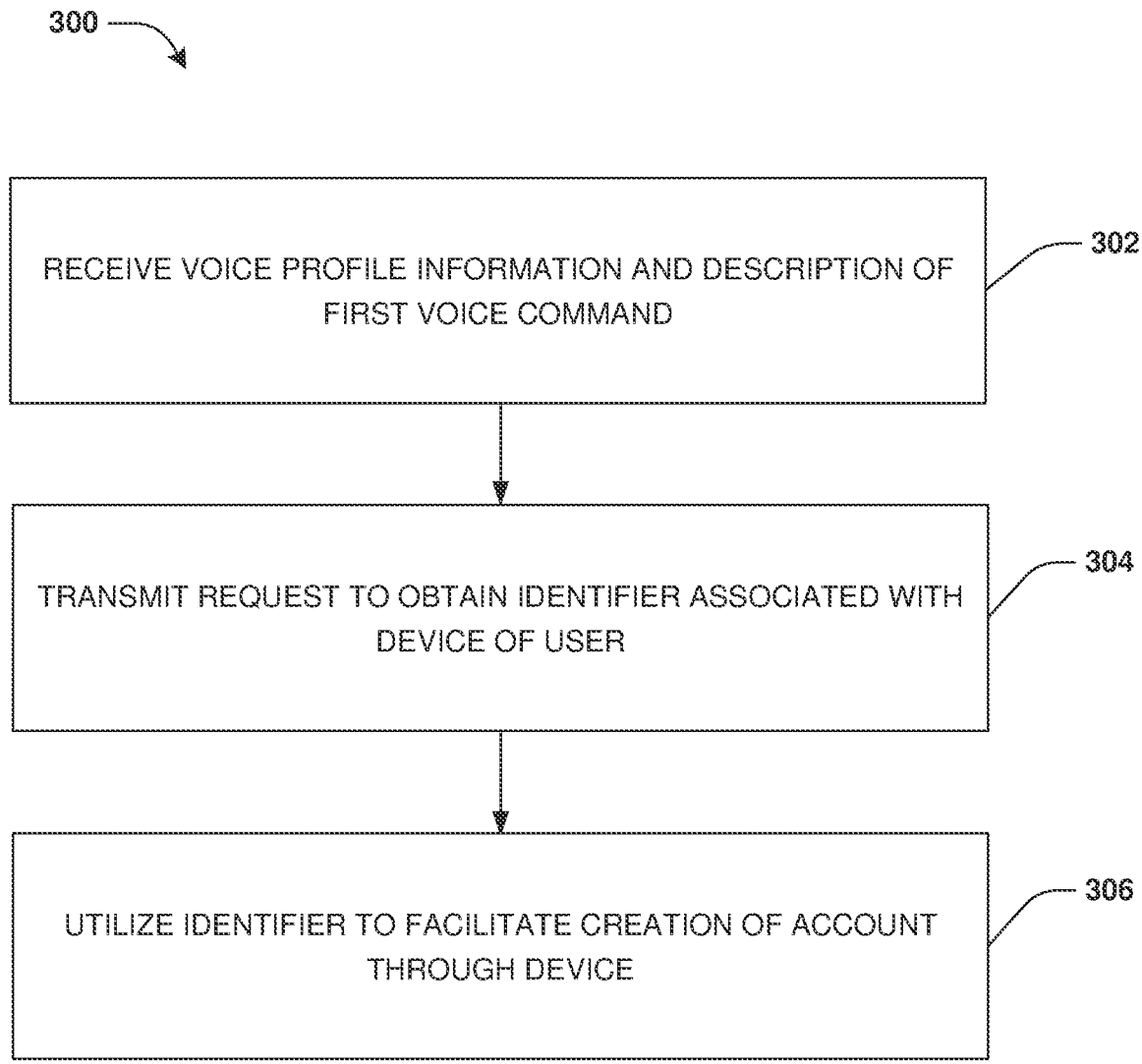
FIG. 3 is a flow chart illustrating an example method for user identification and authentication, where account creation is facilitated.
Figure 4:
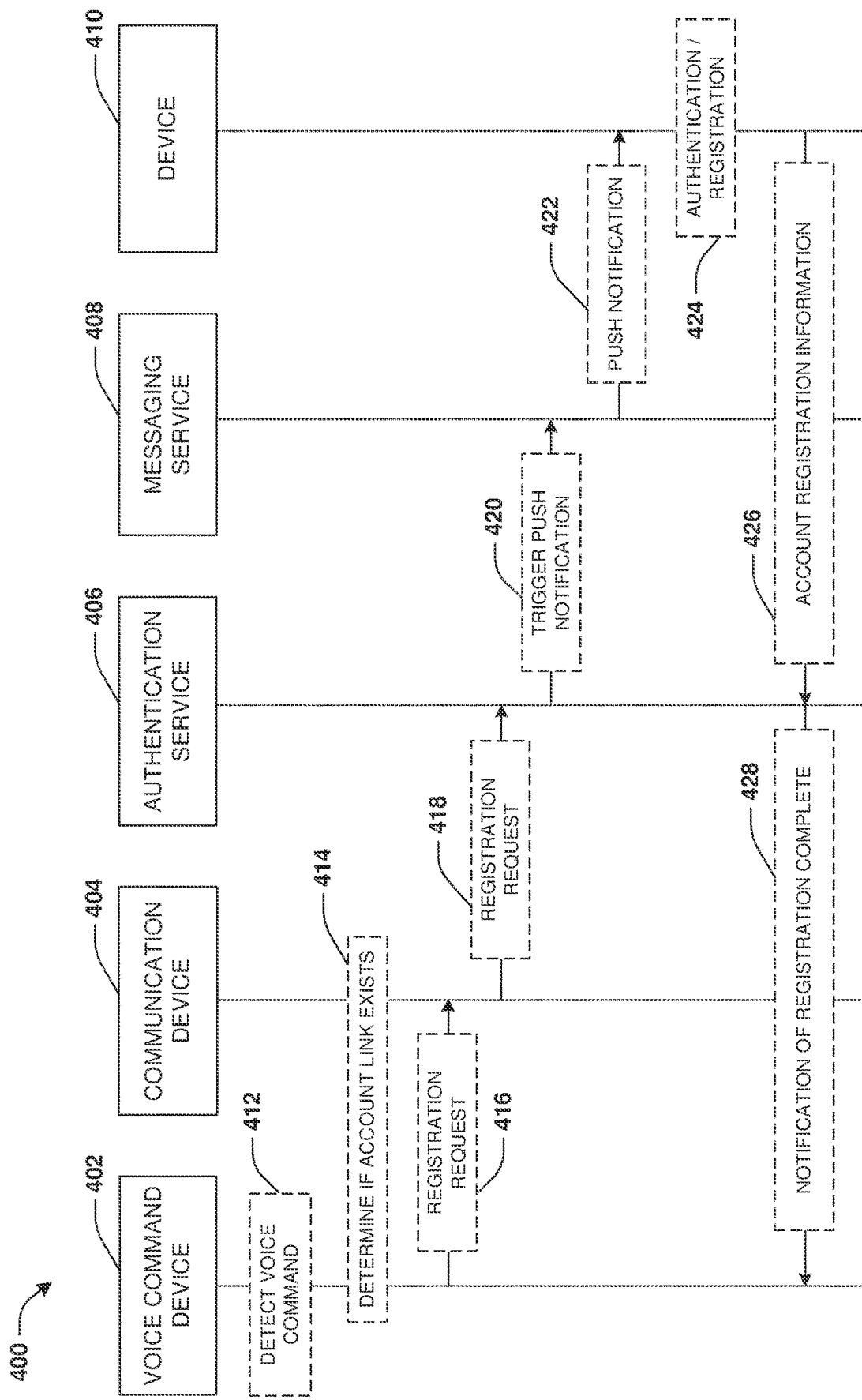
FIG. 4 is a diagram illustrating an example scenario associated with user identification and authentication, where account creation is facilitated.

An embodiment of a voice command device 402, of FIG. 4, performing user identification using a voice profile is illustrated by an exemplary method 200 of FIG. 2 and an embodiment of a communication device 404 facilitating communication with an authentication service 406 for creating and registering an account in order to link the account to the voice profile is illustrated by an exemplary method 300 of FIG. 3, which are further described in conjunction with system 400 of FIG. 4.

During operation 202 of method 200, the voice command device 402 may detect a first voice command 412 to perform an action. For example, a smart speaker within a home of a user may detect the first voice command of "please pay my phone bill with Phone Company A" spoken by the user. The voice command device 402 may utilize speech recognition functionality to determine that the user is requesting the performance of an action to pay a phone bill associated with a bill payment service for Phone Company A. The voice command device 402 may also utilize the speech recognition functionality to determine first voice characteristics of the first voice command. The first voice characteristics may correspond to phonation, pitch, loudness, texture, tone, speech rate, etc. The voice command device 402 may compare the first voice characteristics to voice profiles of users, which are maintained by the voice command device 402. A voice profile of a user may comprise voice characteristics of that user, which can be matched with voice characteristics of voice commands, such as the first voice characteristics of the first voice command. If the voice command device 402 does not identify a voice profile matching the first voice characteristics of the first voice command, then the voice command device 402 may generate a voice profile for the user.

During operation 204 of method 200, the voice command device 402 identifies a voice profile associated with the user based upon the first voice characteristics of the first voice command. For example, the first voice characteristics are used to query voice profiles maintained by the voice command device 402 to identify the voice profile as having voice characteristics that are similar to the first voice characteristics. Once the voice profile is identified by the voice command device 402, the voice command device 402 and/or the communication device 404 determine 414 whether the voice profile is linked to an account associated with the action (e.g., an account with the bill payment service for the Phone Company A). In some examples, account links, linking voice profiles to accounts, are maintained by the voice command device 402, and thus the voice command device 402 may determine whether the voice profile is linked to the account.

In some examples, the communication device 404 may maintain the account links, and thus the voice command device 402 may coordinate with the communication device 404 to determine whether the voice profile is linked to the account associated with the action. Accordingly, during operation 302 of method 300, the communication device 404 receives voice profile information of the voice profile for the user and a description of the first voice command to perform the action (e.g., a text translation or other descriptive information of the first voice command as opposed to the actual audio of the voice command) from the voice command device 402. The communication device 404 may determine whether an account link, linking the voice profile to the account, exists. During operation 304 of method 300, the communication device 404 transmits a request to the voice command device 402 to obtain an identifier associated with a device 410 of the user for user authentication and for creating the account through the device 410. The communication device 404 transmits the request to the voice command device 402 in response to the communication device 404 determining that the voice profile is not linked to the account associated with the action. Accordingly, account creation will be facilitated for creating and registering the account in order for the action to be performed.

During operation 206 of method 200, the voice command device 402 prompts the user to provide the identifier associated with device 410 for creating the account through the device 410. In some examples, the voice command device 402 may provide an audible message to the user in order to request an identifier of a device through which the user would be capable of authenticating and creating the account. Various types of identifiers may be requested, such as a phone number of a smart phone through which the user could authenticate using authentication functionality of the smart phone, an email address, a social network profile, or a variety of other identifiers that could be used to transmit information to the device 410 for authenticating and creating the account.

During operation 208 of method 200, in response to the voice command device 402 receiving the identifier from the user (e.g., the user may provide a new voice command with the phone number of the device 410), the identifier is utilized by the voice command device 402 to facilitate the creation of the account through the device 410. For example, the voice command device 402 transmits a registration request 416 to the communication device 404. The registration request 416 may comprise the voice profile information of the voice profile and/or the identifier of the device 410. The voice command device 402 may transmit the registration request 416 to the communication device 404 for routing to an authentication service 406 (e.g., an identity online server) for facilitating the creation of the account through the device 410. In some examples, the voice command device 402 may associate the identifier with the voice profile of the user.

During operation 306 of method 300, the communication device 404 utilizes the identifier from the registration request 416 to facilitate creation of the account through the device 410. The communication device 404 may transmit a registration request 418 to the authentication service 406 for facilitating the creation of the account through the device 410. In some examples, the registration request 418 may comprise the identifier of the device 410. In some examples, the registration request 418 may comprise a public key so that user authentication and account creation can be performed in a secure manner.

In response to receiving the registration request 418, the authentication service 406 may transmit a trigger push notification command 420 to a messaging service 408. The trigger push notification command 420 may comprise the identifier of the device 410 and a message for the messaging service 408 to transmit to the device 410 as a push notification 422. For example, the identifier may comprise the phone number of the device 410. The messaging service 408 may utilize the phone number to transmit the message to the device 410 for display on the device 410. The message may request that the user authenticate through an authentication service user interface utilizing authentication functionality of the device 410. For example, the device 410 may perform facial recognition, speech recognition, fingerprint recognition, request a password or pin, or perform other types of authentication in order to authenticate the user through the authentication service user interface associated with the authentication service 406. In this way, the user may authenticate for creation and registration of the account (authentication/registration 424) through the device 410.

Various account registration information 426 may be generated based upon the user performing the authentication/registration 424 through the device 410 to create the account with the bill payment service. In some examples, a session identifier may be generated based upon a session associated with the user interacting with the authentication service user interface of the authentication service 406. The account registration information 426 may comprise the session identifier, an authentication key (e.g., the public key), and/or a global unique identifier generated or associated with the user successfully authenticating through the device 410 with the authentication service user interface of the authentication service 406. The authentication service 406 may store the authentication key (e.g., the public key) within a repository for utilization by an authenticator for subsequent authentication of attempts to access the account with the service.

The authentication service 406 may transmit a notification 428 to the communication device 404 that the user created the account through the device 410. In some examples, the notification 428 may comprise the account registration information 426, which may be stored by the communication device 404 within an account link that links the voice profile to the account. For example, the global unique identifier and one or more authentication keys (e.g., the public key and a corresponding private key for the authenticator for subsequent authentication attempts to access the account with the service) may be stored within the account link.

The communication device 404 may transmit the notification 428 to the voice command device 402. In some examples, if the voice command device 402 (e.g., as opposed to the communication device 404) maintains account links, then the voice command device 402 may create the account link based upon the account registration information 426 within the notification 428. The voice command device 402 may provide a notification to the user that the account link has been created and that the user can now provide voice commands in order to perform actions relating to the account with the bill payment service for the Phone Company A.

In some examples, the communication device 404 may be configured to generate rules and/or levels of trust that may be used for registration and/or subsequently performing actions on behalf of users after accounts have been created and registered. For example, the communication device 404 may be configured to determine constraints for the rules and levels of trust regarding allowing the device 410 to be used as an authenticator for authenticating the user and/or how much the device 410 can be trusted. The rules and/or levels of trust may be generated based upon machine learning and/or other components that take into consideration network information, device information, distance information (e.g., a greater distances between the voice command device 402 and the device 410 may indicate a lower level of trust than if both devices were located near one another), and/or network hop information. The rules, levels of trust, and/or other information (e.g., attestation information from third party devices, network information, opt-in signatures, device identifiers, etc.) may be utilized after registration to create authenticator type and association policies. In some examples, the machine learning may be used to detect if the device 410 is a new device type, any known vulnerabilities associated with the device 410, to check a current software version of the device 410, prompt for an alert to upgrade the current software version of the device 410, and/or perform other actions based upon the constraints within the rules and/or levels of trust.

In some embodiments, a policy broker associated with the authentication service 406 (e.g., a policy broker) may link the voice profile of the user to multiple identifying factors, such as the device 410 used as an authenticator, GPS device/information, an eSIM, a device ID of the device 410, etc. The policy broker may allow access to particular resources of devices (e.g., a multi-access edge computing (MEC) client such as the communication device 404, the device 410, the voice command device 402, or any other device such as a videogame console, a television, a tablet, etc.). The policy broker may utilize various polices in order to provide the user with access to particular MEC resources and/or may redirect users to a particular device. For example, the user may be redirected to a device with a threshold amount of performance capabilities (e.g., a device with better performance than other available devices), a device with a particular MEC configuration, a device that can satisfy certain OEM requirements, a 5G slice, a device with latency below a threshold (e.g., a videogame console with low latency enable), a mobile device with a SIM that can utilize a higher bandwidth slice than other devices, etc.

Figure 5:
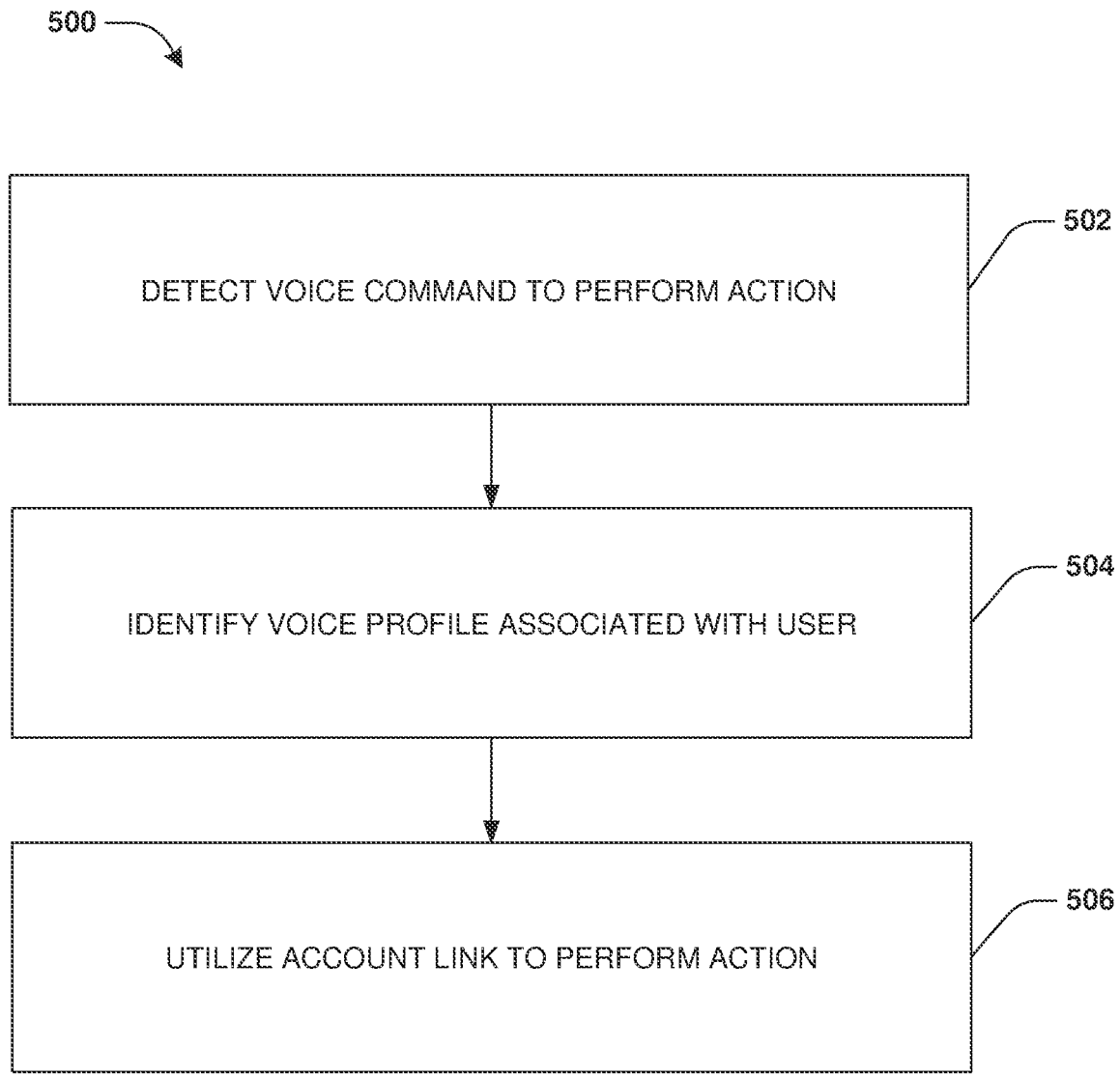
FIG. 5 is a flow chart illustrating an example method for user identification and authentication, where performance of an action is facilitated.
Figure 6:
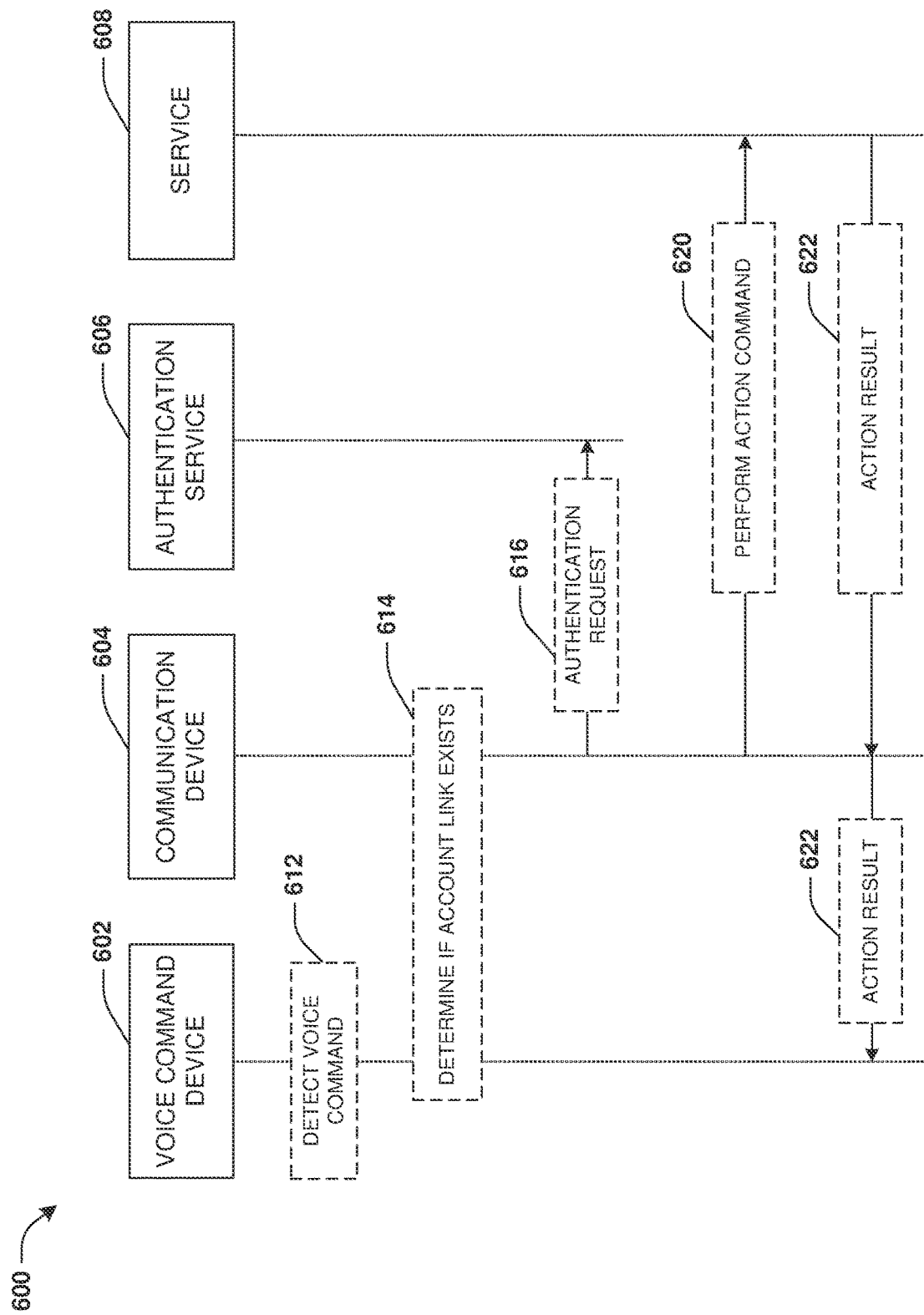
FIG. 6 is a diagram illustrating an example scenario associated with user identification and authentication, where performance of an action is facilitated.

An embodiment of a voice command device 602 and a communication device 604 facilitating the performance of an action by a service 608 is illustrated by an exemplary method 500 of FIG. 5, which is further described in conjunction with system 600 of FIG. 6. During operation 502 of method 500, the voice command device 602 may detect 612 a second voice command to perform an action associated with an account. For example, a user may say "please upgrade my internet connection with Phone Company A to the next fastest speed," which may be detected 612 by the voice command device 602. The voice command device 602 may utilize speech recognition functionality to evaluate the second voice command in order to determine that the user is requesting the performance of an action to upgrade an internet connection to a next fastest speed through a bill payment service for the Phone Company A. The voice command device 602 may also utilize the speech recognition functionality to evaluate the second voice command in order to determine second voice characteristics of the second voice command. The second voice characteristics may correspond to phonation, pitch, loudness, texture, tone, speech rate, etc. The voice command device 602 may compare the second voice characteristics to voice profiles of users that are maintained by the voice command device 602. A voice profile of a user may comprise voice characteristics that can be matched with voice characteristics of voice commands, such as the second voice characteristics of the second voice command.

During operation 504 of method 500, the voice command device 602 identifies a voice profile associated with the user based upon the second voice characters of the second voice command. For example, the second voice characteristics are used to query voice profiles maintained by the voice command device 602 to identify the voice profile as having voice characteristics that are similar to the second voice characteristics. Once the voice profile is identified by the voice command device 602, the voice command device 602 and/or the communication device 604 determine 614 whether the voice profile is linked to an account associated with the action (e.g., an account with the bill payment service for the Phone Company A). In some examples, account links, linking voice profiles to accounts, are maintained by the voice command device 602, and thus the voice command device 602 may determine whether the voice profile is linked to the account. If the voice command device 602 identifies the account link, then the voice command device 602 may transmit an action command to the communication device 604, which may be used to facilitate the performance of the action. The action command may comprise voice profile information associated with the voice profile and/or a description of the second voice command.

In some examples, the communication device 604 may maintain the account links, and thus the voice command device 602 may coordinate with the communication device

604 to determine whether the voice profile is linked to the account associated with the action. For example, the communication device 604 receives the voice profile information and/or the description of the second voice command from the voice command device 602, and utilizes the voice profile information to determine whether the account link exists.

During operation 506 of method 500 of FIG. 5, the account link, linking the voice profile to an account with a service capable of performing the action (e.g., the bill payment service capable of upgrading the user's internet, or any other type of service linked to a user account), is identified and used to facilitate the performance of the action. In some embodiments, in response to identifying the account link, an authentication request 616 is transmitted to the authentication service 606 in order to authenticate the user for performing the action. The authentication request 616 may comprise a global unique identifier and/or an authentication key (e.g., a public key) associated with the account link. In response to the communication device 604 determining that the authentication service 606 successfully authenticated the user (e.g., authenticating the global unique identifier and/or the public key), the communication device 604 may transmit a perform action command 620 to the service 608, such as the bill payment service for the Phone Company A. The perform action command 620 may comprise the voice profile information and/or the description of the second voice command (e.g., a message that the user wants to perform the action through the service 608 to upgrade the internet to the next fastest speed). In response to the communication device 604 and/or the voice command device 602 receiving a success notification generated from the service 608 that the service 608 upgraded the internet of the user to the next fastest speed, the success notification may be provided to the user, such as through an audible message provided by the voice command device 602. Once the service 608 completes the action (or attempts to complete the action, but there is a failure or additional information is required), an action result 622 is provided from the service 608 to the communication device 604. The communication device 604 may forward the action result 622 to the voice command device 602 that will provide a notification to the user based upon the action result 622 (e.g., a success notification, a failure notification, a request for additional information or details required to perform the action, etc.).

According to some embodiments, a method is provided. The method includes detecting a first voice command to perform an action; identifying a voice profile associated with a user based upon first voice characteristics of the first voice command; in response to determining that the voice profile is not linked to an account associated with the action, prompting the user for an identifier associated with a device for creating the account through the device; and in response to receiving the identifier from the user, utilizing the identifier to facilitate creation of the account through the device.

According to some embodiments, the method includes transmitting a registration request associated with the identifier to a communication device for routing to an authentication service for facilitating the creation of the account through the device.

According to some embodiments, the registration request comprises voice profile information associated with the voice profile and the identifier.

According to some embodiments, the method includes receiving a notification that the account was created through the device in response to a push notification provided to the device by a messaging interface utilized by the authentication service for facilitating the creation of the account through the device.

According to some embodiments, the method includes in response to receiving account registration information associated with the account created through the device, utilizing the account registration information to create an account link linking the voice profile with the account.

According to some embodiments, the method includes storing a global unique identifier and an authentication key comprised within the account registration information into the account link.

According to some embodiments, the method includes in response to receiving the identifier from the user, associating the identifier with the voice profile.

According to some embodiments, the method includes detecting a second voice command to perform the action associated with the account; identifying the voice profile associated with the user based upon second voice characteristics of the second voice command; and determining whether an account link, linking the voice profile to the account, exists.

According to some embodiments, the method includes in response to determining that the account link exists, utilizing the account link to facilitate performance of the action.

According to some embodiments, the method includes transmitting an action command comprising voice profile information associated with the voice profile and the second voice command to a communication device, wherein the action command triggers the communication device to utilize an authentication service to authenticate the user based upon a global unique identifier and an authentication key associated with the account link.

According to some embodiments, the action command triggers the communication device to transmit a perform action command to a service to perform the action.

According to some embodiments, the perform action command comprises the voice profile information and the second voice command.

According to some embodiments, a non-transitory computer-readable medium storing instructions that when executed facilitate performance of operations, is provided. The operations include receiving voice profile information of a voice profile associated with a user and a first voice command by the user to perform an action; in response to determining that the voice profile is not linked to an account associated with the action, transmitting a request to obtain an identifier associated with a device of the user for creating the account through the device; and in response to receiving the identifier, utilizing the identifier to facilitate creation of the account through the device.

According to some embodiments, the operations include transmitting a registration request to an authentication service for facilitating the creation of the account through the device.

According to some embodiments, the operations include receiving a notification that the account was created through the device in response to a push notification provided to the device by a messaging interface utilized by the authentication service for facilitating the creation of the account through the device.

According to some embodiments, the operations include in response to receiving account registration information associated with the account created through the device, utilizing the account registration information to create an account link linking the voice profile with the account.

According to some embodiments, the operations include receiving the voice profile information and a second voice command by the user to perform the action; and in response to determining that the account link exists, utilizing the account link to facilitate the performance of the action.

According to some embodiments, the operations include utilizing an authentication service to authenticate the user based upon a global unique identifier and an authentication key associated with the account link; and transmitting a perform action command to a service to perform the action in response to successful authentication of the user by the authentication service.

According to some embodiments, a system is provided. The system comprises a processor coupled to memory, the processor configured to execute instructions to perform operations. The operations include detecting a voice command to perform an action associated with an account; identifying a voice profile associated with a user based upon voice characteristics of the voice command; and in response to determining that an account link, linking the voice profile to the account, exists, utilizing the account link to facilitate performance of the action.

According to some embodiments, the operations include utilizing an authentication service to authenticate the user based upon a global unique identifier and an authentication key associated with the account link; and transmitting a perform action command to a service to perform the action in response to successful authentication of the user by the authentication service.

Figure 7:
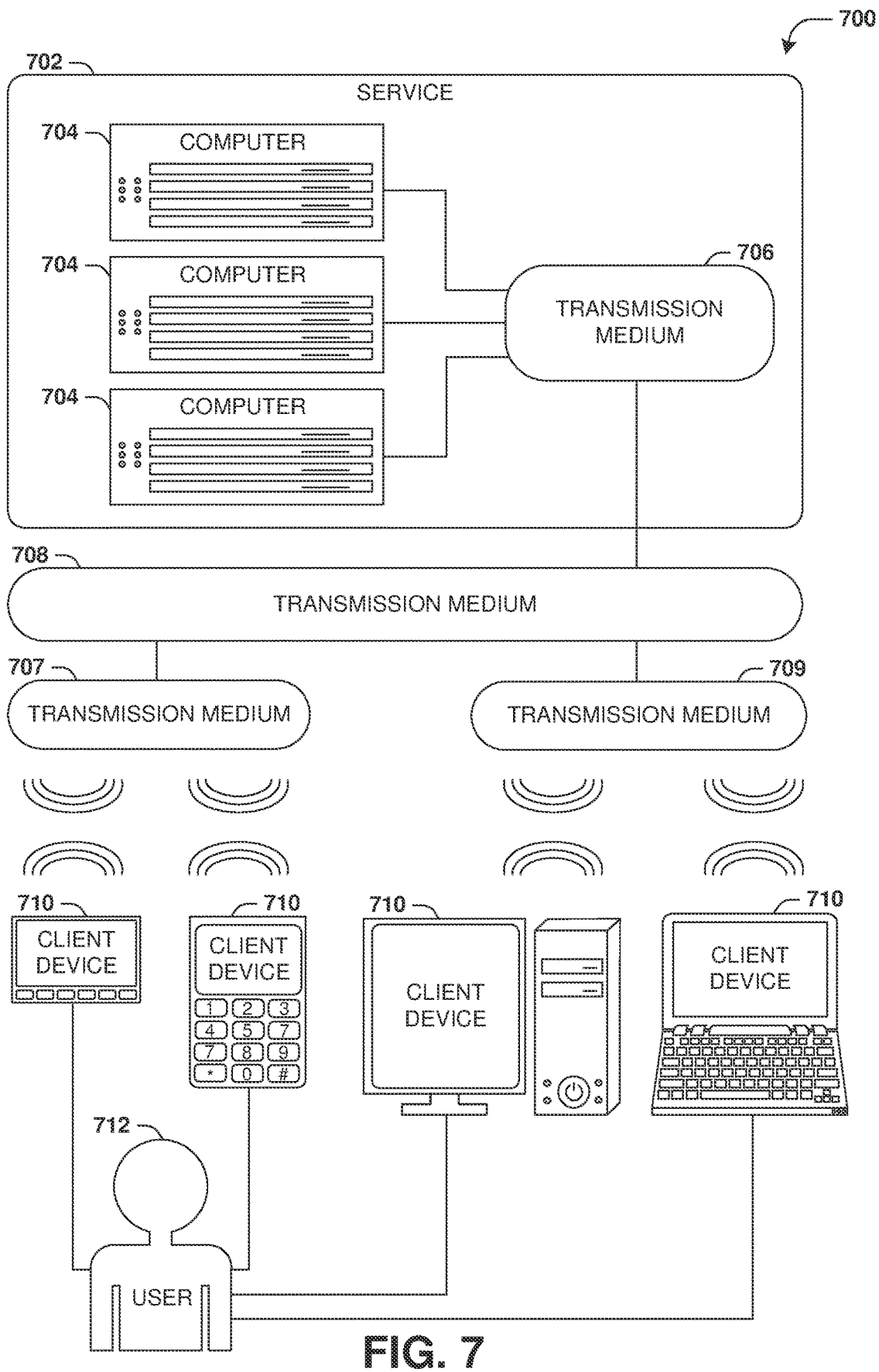
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 704 and the client devices 710 may communicate over various types of transmission mediums.

Figure 8:
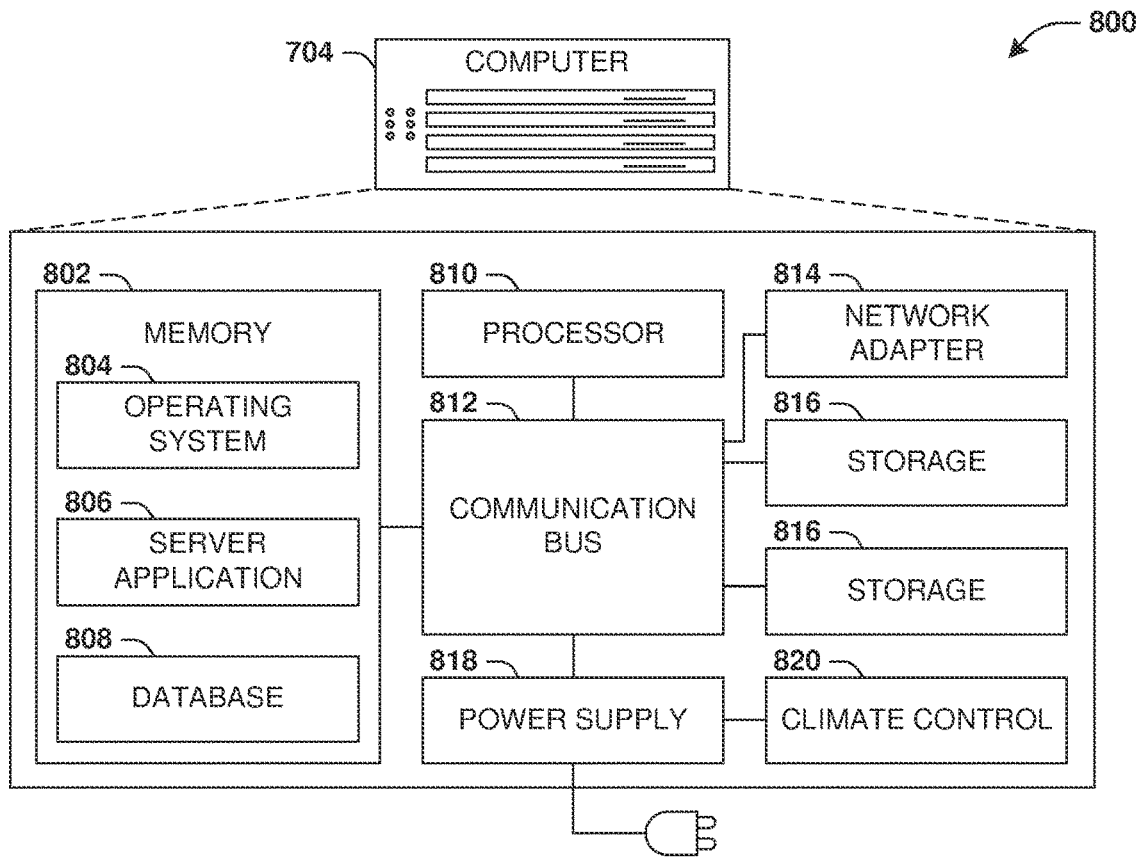
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multi-bus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
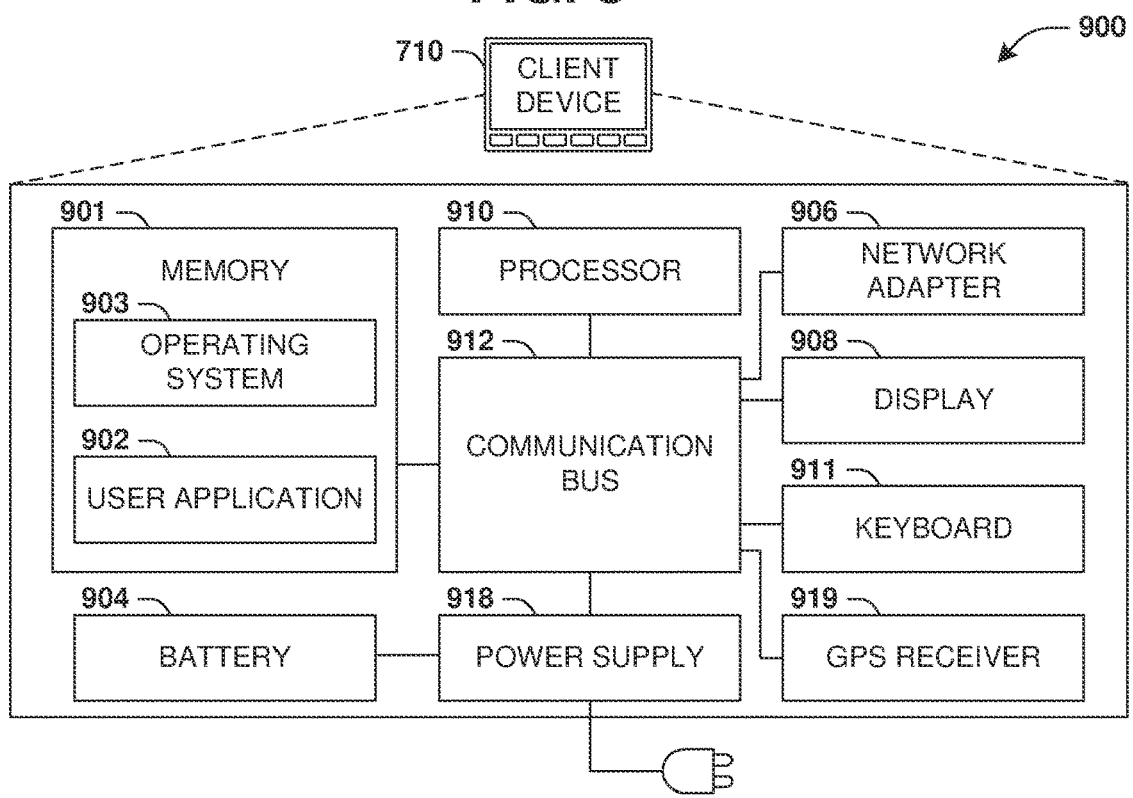
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

Figure 10:
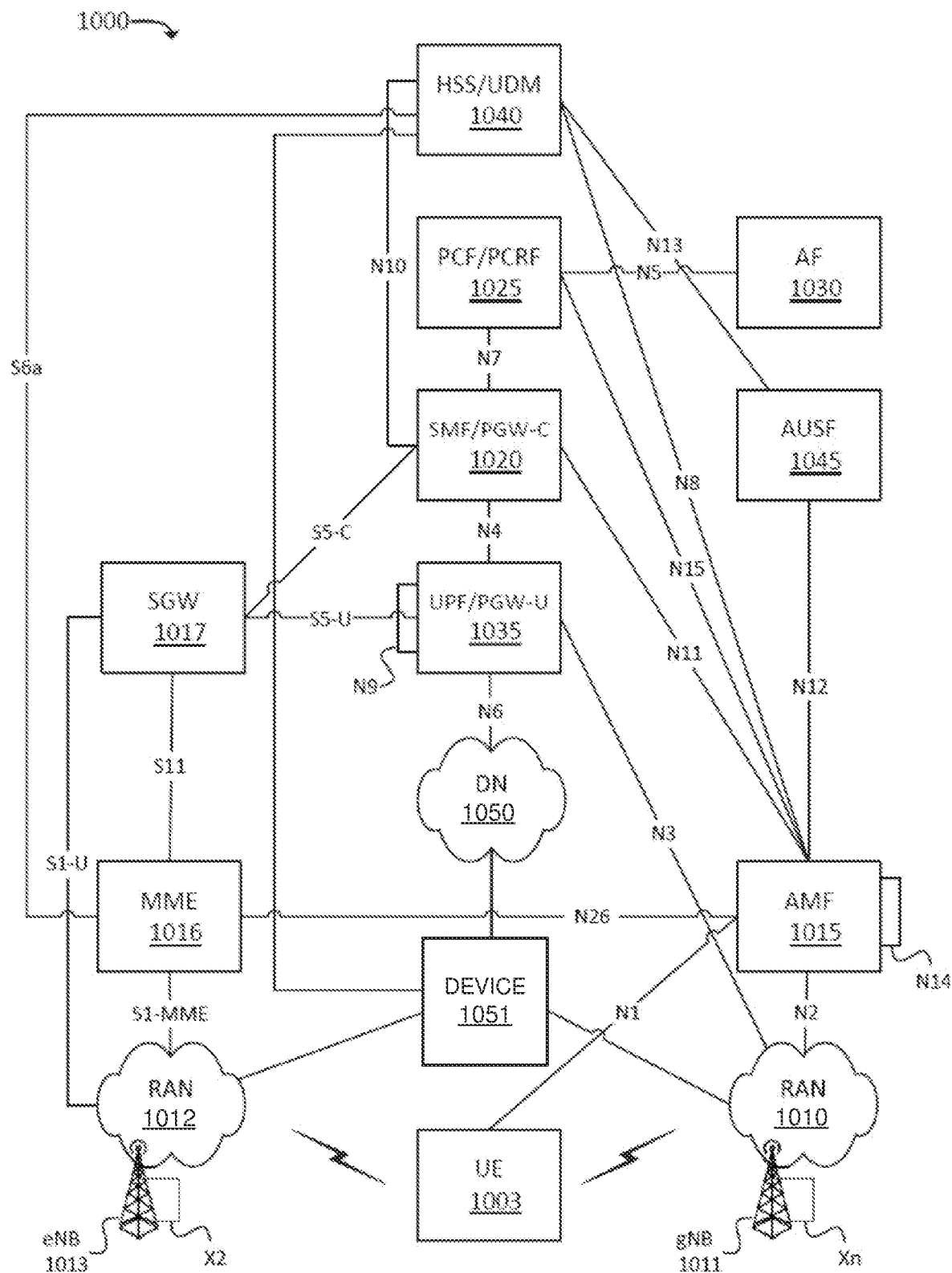
FIG. 10 is an illustration of an example environment in which at least a portion of the techniques presented herein may be utilized and/or implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as device 1051 corresponding to a voice command device, a communication device, an authentication service, a messaging service, a service, a client device capable of identifying users, a client device capable of authenticating users, etc.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The device 1051 may include one or more devices, systems, VNFs, etc., that perform one or more operations described herein. For example, the device 1051 detect voice commands, facilitate the creation of accounts, and/or perform actions associated with the accounts.

Figure 11:
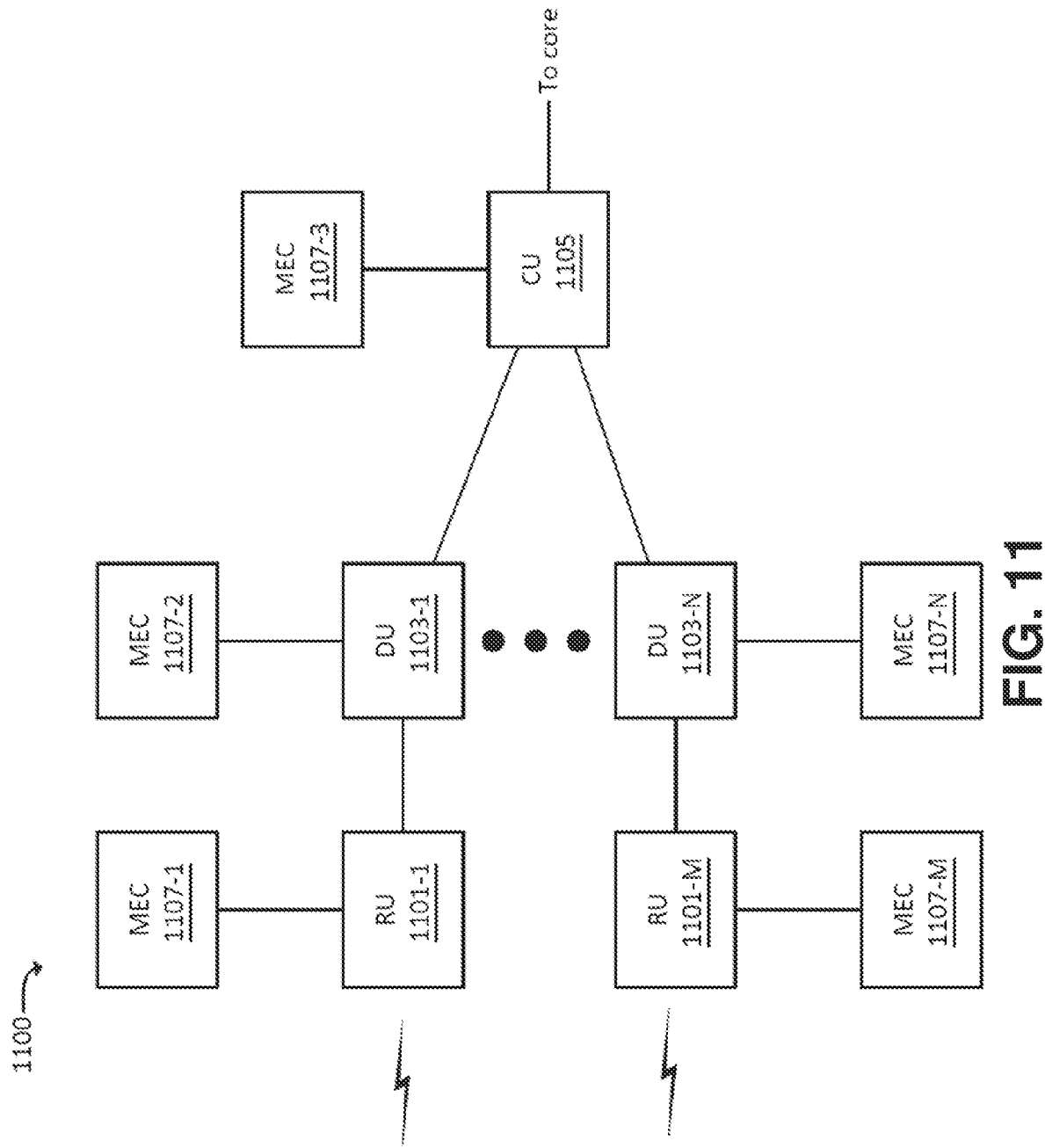
FIG. 11 is an illustration of an example network that may utilize and/or implement at least a portion of the techniques presented herein.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1003, and may determine which DU(s) 1103 should receive the downlink traffic. DU 1103 may include one or more devices that transmit traffic between a core network (e.g., via CU 1105) and UE 1003 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1003.

RU 1101 may include hardware circuitry (e.g., one or more RF transceivers, antennas, radios, and/or other suitable hardware) to communicate wirelessly (e.g., via an RF interface) with one or more UEs UE 1003, one or more other DUs 1103 (e.g., via RUs 1101 associated with DUs 1103), and/or any other suitable type of device. In the uplink direction, RU 1101 may receive traffic from UE 1003 and/or another DU 1103 via the RF interface and may provide the traffic to DU 1103. In the downlink direction, RU 1101 may receive traffic from DU 1103, and may provide the traffic to UE 1003 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1003, via a respective RU 1101.

For example, RU 1101-1 may route some traffic, from UE 1003, to MEC 1107-1 instead of to a core network (e.g., via DU 1103 and CU 1105). MEC 1107-1 may process the traffic, perform one or more computations based on the received traffic, and may provide traffic to UE 1003 via RU 1101-1. In this manner, ultra-low latency services may be provided to UE 1003, as traffic does not need to traverse DU 1103, CU 1105, and an intervening backhaul network between DU network 1100 and the core network. In some embodiments, MEC 1107 may include, and/or may implement some or all of the functionality described above with respect to the device 1051, such as a voice command device, a communication device, an authentication service, a messaging service, a service, and/or a user device.

Figure 12:
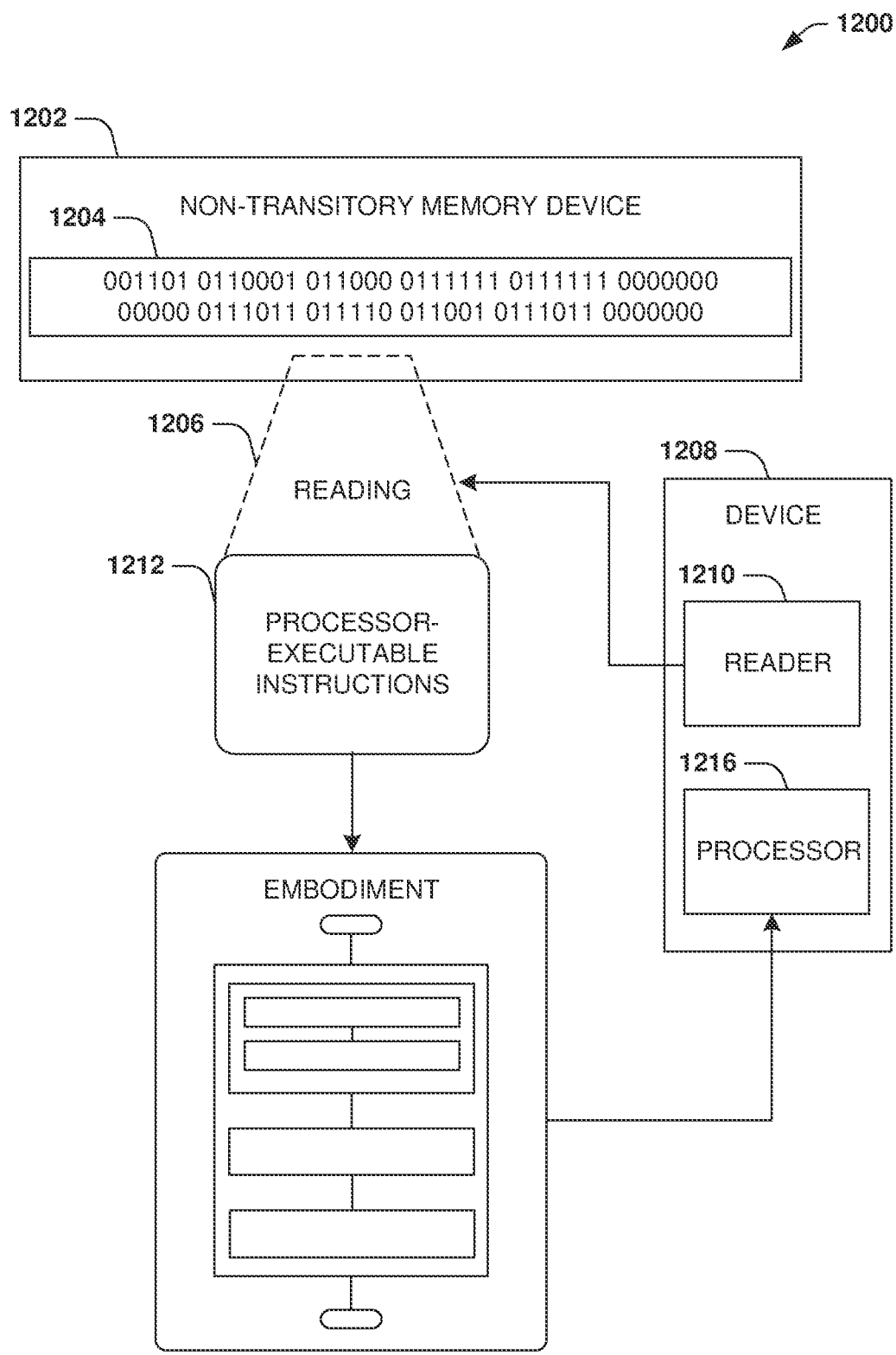
FIG. 12 is an illustration of a scenario featuring an example non-transitory machine readable medium in accordance with one or more of the provisions set forth herein.

FIG. 12 is an illustration of a scenario 1200 involving an example non-transitory machine readable medium 1202. The non-transitory machine readable medium 1202 may comprise processor-executable instructions 1212 that when executed by a processor 1216 cause performance (e.g., by the processor 1216) of at least some of the provisions herein. The non-transitory machine readable medium 1202 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1202 stores computer-readable data 1204 that, when subjected to reading 1206 by a reader 1210 of a device 1208 (e.g., a read head of a hard disk drive, or a read operation invoked on a solid-state storage device), express the processor-executable instructions 1212. In some embodiments, the processor-executable instructions 1212, when executed cause performance of operations, such as at least some of the example method 200 of FIG. 2, example method 300 of FIG. 3, and/or the example method 500 of FIG. 5, for example. In some embodiments, the processor-executable instructions 1212 are configured to cause implementation of a system, such as at least some of the example system 100 of FIG. 1, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed is:

1. A method comprising:
   detecting a first voice command to perform an action;
   identifying a voice profile associated with a user based upon first voice characteristics of the first voice command;
   in response to determining that the voice profile is not linked to an account associated with the action, prompting the user for an identifier associated with a device for creating the account through the device; and
   in response to receiving the identifier from the user, utilizing the identifier to facilitate creation of the account through the device.

2. The method of claim 1, wherein facilitating the creation of the account comprises:
   transmitting a registration request associated with the identifier to a communication device for routing to an authentication service for facilitating the creation of the account through the device.

3. The method of claim 2, wherein the registration request comprises voice profile information associated with the voice profile and the identifier.

4. The method of claim 2, comprising:
   receiving a notification that the account was created through the device in response to a push notification provided to the device by a messaging interface utilized by the authentication service for facilitating the creation of the account through the device.

5. The method of claim 1, comprising:
in response to receiving account registration information associated with the account created through the device, utilizing the account registration information to create an account link linking the voice profile with the account.

6. The method of claim 5, wherein the utilizing the account registration information comprises:
storing a global unique identifier and an authentication key comprised within the account registration information into the account link.

7. The method of claim 1, comprising:
in response to receiving the identifier from the user, associating the identifier with the voice profile.

8. The method of claim 1, comprising:
detecting a second voice command to perform the action associated with the account;
identifying the voice profile associated with the user based upon second voice characteristics of the second voice command; and
determining whether an account link, linking the voice profile to the account, exists.

9. The method of claim 8, comprising:
in response to determining that the account link exists, utilizing the account link to facilitate performance of the action.

10. The method of claim 9, wherein the utilizing the account link to facilitate performance of the action comprises:
transmitting an action command comprising voice profile information associated with the voice profile and a description of the second voice command to a communication device, wherein the action command triggers the communication device to utilize an authentication service to authenticate the user based upon a global unique identifier and an authentication key associated with the account link.

11. The method of claim 10, wherein the action command triggers the communication device to transmit a perform action command to a service to perform the action.

12. The method of claim 11, wherein the perform action command comprises the voice profile information and the second voice command.

13. A non-transitory computer-readable medium storing instructions that when executed facilitate performance of operations comprising:
receiving voice profile information of a voice profile associated with a user and a description of a first voice command by the user to perform an action;
in response to determining that the voice profile is not linked to an account associated with the action, transmitting a request to obtain an identifier associated with a device of the user for creating the account through the device; and
in response to receiving the identifier, utilizing the identifier to facilitate creation of the account through the device.

14. The non-transitory computer-readable medium of claim 13, wherein the operation for utilizing the identifier to facilitate creation of the account through the device comprises:
transmitting a registration request to an authentication service for facilitating the creation of the account through the device.

15. The non-transitory computer-readable medium of claim 14, wherein the operations comprise:
receiving a notification that the account was created through the device in response to a push notification provided to the device by a messaging interface utilized by the authentication service for facilitating the creation of the account through the device.

16. The non-transitory computer-readable medium of claim 13, wherein the operations comprise:
in response to receiving account registration information associated with the account created through the device, utilizing the account registration information to create an account link linking the voice profile with the account.

17. The non-transitory computer-readable medium of claim 16, wherein the operations comprise:
receiving the voice profile information and a description of a second voice command by the user to perform the action; and
in response to determining that the account link exists, utilizing the account link to facilitate the performance of the action.

18. The non-transitory computer-readable medium of claim 17, wherein the operations comprise:
utilizing an authentication service to authenticate the user based upon a global unique identifier and an authentication key associated with the account link; and
transmitting a perform action command to a service to perform the action in response to successful authentication of the user by the authentication service.

19. A system comprising:
a memory comprising instructions; and
a processor coupled to the memory, the processor configured to execute the instructions to facilitate performance of operations comprising:
detecting a voice command to perform an action associated with an account;
identifying a voice profile associated with a user based upon voice characteristics of the voice command;
in response to determining that an account link, linking the voice profile to the account, exists, utilizing the account link to facilitate performance of the action;
detecting a second voice command to perform a second action;
in response to determining that the voice profile is not linked to a second account associated with the second action, transmitting a request to obtain an identifier associated with a device for creating a second account link; and
in response to receiving the identifier, utilizing the identifier to facilitate creation of the second account link.

20. The system of claim 19, wherein the operations comprise:
utilizing an authentication service to authenticate the user based upon a global unique identifier and an authentication key associated with the account link; and
transmitting a perform action command to a service to perform the action in response to successful authentication of the user by the authentication service.

* * * * *